US007215099B2

United States Patent
Ylppö et al.

(10) Patent No.: US 7,215,099 B2
(45) Date of Patent: May 8, 2007

(54) METHOD IN FREQUENCY CONVERTER PROVIDED WITH VOLTAGE INTERMEDIATE CIRCUIT, AND FREQUENCY CONVERTER

(75) Inventors: Jukka Ylppö, Helsinki (FI); Kari Turunen, Vantaa (FI)

(73) Assignee: ABB Oy, Helsinki (FI)

( * ) Notice: Subject to any disclaimer, the term of this patent is extended or adjusted under 35 U.S.C. 154(b) by 93 days.

(21) Appl. No.: 11/194,598

(22) Filed: Aug. 2, 2005

(65) Prior Publication Data
US 2006/0034357 A1 Feb. 16, 2006

(30) Foreign Application Priority Data
Aug. 13, 2004 (FI) ............................. 20045292 U

(51) Int. Cl.
*H02P 9/44* (2006.01)
*H02M 5/45* (2006.01)

(52) U.S. Cl. ............................ 322/29; 322/32; 322/99; 363/37; 363/123

(58) Field of Classification Search .................. 290/44, 290/52; 322/29, 32, 99; 363/37, 123
See application file for complete search history.

(56) References Cited

U.S. PATENT DOCUMENTS

| 5,083,039 | A * | 1/1992 | Richardson et al. | 290/44 |
| 6,175,217 | B1 * | 1/2001 | Da Ponte et al. | 322/19 |
| 6,380,719 | B2 * | 4/2002 | Underwood et al. | 322/36 |
| 6,850,426 | B2 * | 2/2005 | Kojori et al. | 363/123 |
| 6,882,060 | B2 * | 4/2005 | Matsuo et al. | 290/52 |
| 7,015,595 | B2 * | 3/2006 | Feddersen et al. | 290/44 |
| 7,061,211 | B2 * | 6/2006 | Satoh et al. | 322/12 |
| 7,095,130 | B2 * | 8/2006 | Ichinose et al. | 290/44 |
| 7,120,037 | B2 * | 10/2006 | Komatsu et al. | 363/37 |

FOREIGN PATENT DOCUMENTS

JP 7-337090 12/1995

OTHER PUBLICATIONS

L. Holdsworth et al., "Comparison of Fixed Speed and Doubly-Fed Induction Wind Turbines During Power System Disturbances", IEE Proc.-Gener. Transn. Distrib., May 2003, pp. 343-352, vol. 150, No. 3.
Gautam Poddar et al., "Sensorless Variable-Speed Controller For Existing Fixed-Speed Wind Power Generator With Unity-Power-Factor Operation", IEEE Transactions on Industrial Electronics, Oct. 2003, pp. 1007-1015, vol. 50, No. 5.

\* cited by examiner

*Primary Examiner*—Nicholas Ponomarenko
(74) *Attorney, Agent, or Firm*—Buchanan Ingersoll & Rooney PC

(57) ABSTRACT

A method in a frequency converter provided with a voltage intermediate circuit in connection with interference in a network (5) to be supplied and a frequency converter (2), which comprises a network converter part (4) and an inverter part (3) and a DC intermediate circuit (7) between them. The method comprises steps of controlling the intermediate circuit voltage at the beginning of network interference by limiting the torque on the inverter side, detecting interference in the network voltage, setting a torque reference to a predetermined value in response to the network interference, detecting network voltage recovery, and controlling the torque reference to a normal value in response to the network voltage recovery.

14 Claims, 1 Drawing Sheet

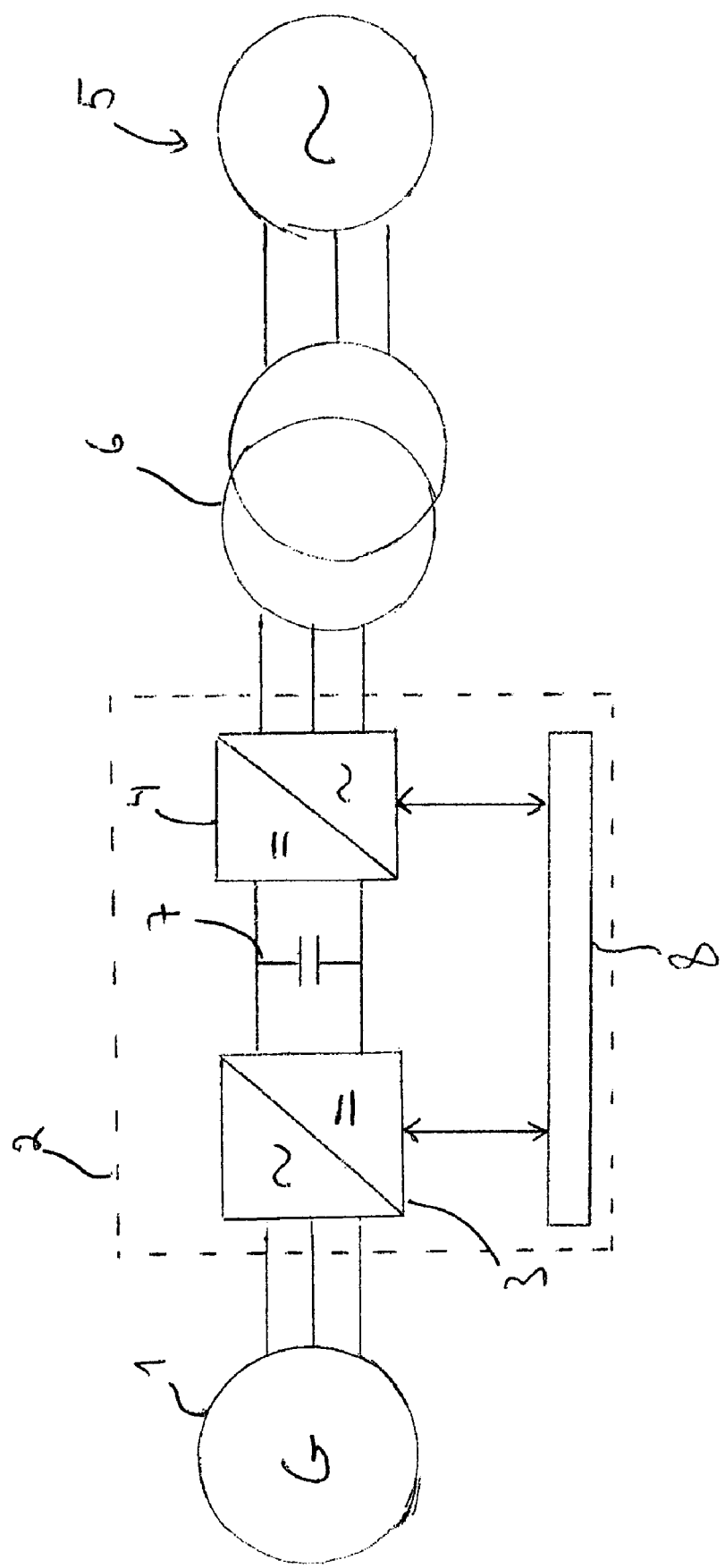

METHOD IN FREQUENCY CONVERTER PROVIDED WITH VOLTAGE INTERMEDIATE CIRCUIT, AND FREQUENCY CONVERTER

BACKGROUND OF THE INVENTION

The invention relates to a method in a frequency converter provided with a voltage intermediate circuit and to a frequency converter. In particular, the invention relates to the operation of a frequency converter in connection with interference in network voltage.

A frequency converter is a device which is generally used in connection with motors and generators. In motor use, the frequency converter is supplied by the network and it generates voltage for the motor for controlling it in the desired manner. In direct generator use, i.e. in a use where the power generated by the generator is transferred through the frequency converter, the frequency converter may convert the voltage generated by the generator into voltage that can be supplied to the network.

Many existing frequency converters create an electric model of the machine to be controlled. This model provides the frequency converter with as accurate information as possible on the electric state of the machine and on its magnetic fluxes in addition to currents and voltages. By means of electric models, the torque generated by the machine, for example, can be adjusted in a very rapid time domain. The network converter part of the frequency converter may create an electric model of the network to be supplied in a corresponding manner.

When the network voltage decreases or disappears, the network converter part of the frequency converter can transfer only a very small amount of the effective power produced by the generator to the network or no effective power at all. As a result of this, the network converter current increases up to a set current limit and, at the same time, the voltage of the DC intermediate circuit rises. Thus the generator produces power that cannot be transferred to the network in its entirety.

The simplest solution for protecting a frequency converter is to disconnect the generator from the inverter of the frequency converter when the intermediate circuit voltage increases too much. Such a solution is not, however, cost effective since the connecting and disconnecting are slow procedures, requiring re-start of the whole system.

Earlier, the rise in the intermediate circuit voltage has been limited employing various brake choppers or crowbar arrangements, where the produced power is used in resistor resistances. A disadvantage associated with such solutions is that if it has been necessary to end the modulation of the frequency converter, the generator start-up and synchronization cause a generator delay. The ending of modulation results in a loss of accurate information on the electric state of the generator and network, and consequently, when the network normalizes, the frequency converter has to synchronize with the generator and the network to be supplied.

BRIEF DESCRIPTION OF THE INVENTION

The object of the invention is to provide a method which avoids the above-mentioned drawbacks and enables controlling a frequency converter in a reliable manner even in connection with network interference. The object of the invention is achieved by a method and a frequency converter which are characterized by what is stated in the independent claims. Preferred embodiments of the invention are disclosed in the dependent claims.

The invention is based on controlling the power to be transferred to the network to a predetermined value using a frequency converter. This value may be zero when interference is detected in the network to be supplied. Thanks to this control procedure, the amount of effective power to be transferred can be reduced for the duration of network interference. Even though the transfer of effective power were stopped altogether, reactive power could still be transferred. For this reason, the frequency converter modulates continuously and thus remains synchronized with the generator and the network. After network recovery, the transfer of effective power can be started immediately. Thus the advantages of the invention are achievable by using a frequency converter according to the invention.

BRIEF DESCRIPTION OF THE FIGURES

The invention will now be described in greater detail by means of preferred embodiments with reference to the accompanying drawing, in which FIG. 1 schematically illustrates a frequency converter in generator use.

DETAILED DESCRIPTION OF THE INVENTION

FIG. 1 schematically illustrates a switching between a generator 1, a frequency converter 2 and a network 5, where the generator 1 produces electricity that is transferred to the network through the frequency converter 2. A transformer is used to transform the voltage level of the output voltage to correspond to the network voltage level.

FIG. 1 does not illustrate the mechanical power source driving the generator. Such a power source may be a wind turbine and the generator may be a synchronous machine or an induction machine, for instance.

The frequency converter 2 in FIG. 1 comprises an inverter part 3 and a network converter part 4. The function of the inverter part is to transfer, by means of torque control, the power produced by the generator to a DC voltage intermediate circuit provided with a capacitor 7 for the DC intermediate circuit. The inverter part is implemented by controllable semiconductors in a known manner as a bridge circuit, and thus the torque magnitude can be controlled by the inverter part.

A network converter part 4 is further connected to the DC intermediate circuit. The function of the network converter part is to control the voltage of the DC intermediate circuit to a desired level and generate alternating voltage from the direct voltage that is supplied to the network so that the frequency of the alternating voltage corresponds to that of the network and is within predetermined limits with respect to the network voltage. FIG. 1 illustrates a transformer 6 between the network converter part 4 and the network 5. The purpose of the transformer is to transform the frequency converter voltage to correspond to the network voltage. In addition, the transformer equalizes the curve forms of the output voltage and current of the frequency converter.

FIG. 1 further illustrates a control unit 8, which controls the inverter part and the network converter part. The control unit is illustrated in a simplified manner so that it communicates only with the inverter part and the network converter part. However, it is clear that the control unit collects any information on currents and voltages and receives instructions for implementing the control from an upper level.

When interference occurs in the network 5 to be supplied, such as a momentary decrease or disappearance of voltage, all the electric power produced by the generator cannot be fed into the network. At the beginning of such network interference, the current of the network converter rises rapidly and it can feed only a relatively small amount of power into the network, which raises the intermediate circuit voltage, too. The current and voltage control circuits of the frequency converter try to limit the DC intermediate circuit voltage by restricting the generator torque so as to prevent the direct voltage from rising up to a trigger limit.

As stated above, the voltage of the intermediate circuit rises rapidly immediately after the onset of network interference. The network interference can thus be detected from the rising intermediate circuit voltage by means of the control unit, or correspondingly from output voltage measurements carried out by the network converter.

After the network interference has been detected, a signal indicating network interference is transmitted to the inverter part 3 according to the invention. In response to this signal, the inverter part adjusts its torque reference to a predetermined value, which is preferably zero. Since the events proceed relatively quickly, the inverter part has to implement the torque reference very rapidly. A particularly suitable inverter control method for this purpose is a solution based on direct torque control. In connection with such a control method, the inverter can directly be given a torque reference since the torque is a controllable property.

Even though the torque of the inverter part of the frequency converter is controlled to zero according to the method of the invention, in which case no effective power is transferred, reactive power can still be transferred to the network. The amount of the reactive power to be transferred can be influenced by the magnitude of the DC intermediate circuit voltage and by the amplitude of the output voltage vector of the network converter. The amount of effective power to be transferred is limited by the current limit of the network converter of the frequency transformer.

While the network to be supplied is still recovering, this recovery is detected and information on it is signaled to the inverter part. In response to this signal, the torque reference is set to correspond to the original reference and power supply to the network may continue normally. According to a preferred embodiment of the invention, a ramp is employed in the transition to the original reference. This ensures swift transition to the normal state without fear of overcurrent tripping.

In the method according to the invention, the frequency converter is used normally all the time. In other words, switching instructions are continuously generated for the frequency converter, and the inverter part and network converter part implement these instructions. Thus the frequency converter has continuous information on the state and operating point of both the network and the generator, which enables power transfer without synchronization or other delays after the normalization of the network.

It is important to the functioning of the method according to the invention that the network converter part comprise means for signaling information on the network state. Even though network interference can be detected as a rise in the intermediate circuit voltage at the inverter part 3, the disappearance of the network interference cannot be noted at this part. Thus the network converter part 4 has to determine the network voltage and signal information at least on the network recovery close to the normal state, in which case the frequency converter can be controlled to the operating state as described above.

If the network to be supplied is totally cut off, according to a preferred embodiment of the invention, the DC intermediate circuit voltage is monitored in case of undervoltage and the generator torque is adjusted so that the intermediate circuit voltage cannot decrease below the undervoltage release limit. When the DC intermediate circuit voltage decreases, the kinetic energy of the work machine of the generator is employed and the voltage maintained above the undervoltage tripping limit using the inverter part.

The method according to the invention and the apparatus implementing the method are particularly applicable for use in connection with wind power plants since the method according to the invention improves the usability of the apparatus and minimizes the time the apparatus is unused due to network interference. In particular, the method and frequency converter according to the invention provide a wind turbine use where the wind turbine may rotate freely at the frequency determined by the wind force. In such a use, a synchronous machine or a short circuit machine can be employed as the generator.

It is obvious to a person skilled in the art that as the technology advances, the inventive concept can by implemented in various ways. The invention and its embodiments are thus not restricted to the examples described above but they may vary within the scope of the claims.

The invention claimed is:

1. A method in a frequency converter provided with a voltage intermediate circuit in connection with interference in a network to be supplied, the frequency converter comprising a network converter part and an inverter part and a DC intermediate circuit between them, the method comprising controlling the intermediate circuit voltage at the beginning of network interference by limiting the torque on the inverter side, detecting interference in the network voltage, setting a torque reference to a predetermined value in response to the network interference, detecting network voltage recovery, and controlling the torque reference to a normal value in response to the network voltage recovery.

2. A method according to claim 1, wherein the network interference is detected as an increase in the DC intermediate circuit voltage or from measurements carried out by the network converter.

3. A method according to claim 1, wherein the network interference is detected in the output of the network converter part.

4. A method according to claim 1, wherein the detecting of the network interference comprises a step where information on the interference is transmitted to the control unit of the frequency converter.

5. A method according to claim 1, wherein the setting of the torque reference to a predetermined value comprises a step where the torque of the inverter part is controlled to a predetermined value.

6. A method according to claim 1, wherein the predetermined value of the torque reference is zero or another computed value.

7. A method according to claim 1, wherein the network voltage recovery is detected in the output of the network converter part.

8. A method according to claim 1, wherein the detecting of the network voltage recovery comprises a step where information on the network voltage recovery is transmitted to the control unit.

9. A method according to claim 1, wherein the controlling of torque reference to a normal value comprises a step where the torque reference is controlled to the normal value using a ramp.

10. A frequency converter provided with a voltage intermediate circuit and comprising a network inverter part and an inverter part and a DC intermediate circuit between them, the frequency converter comprising
- means for controlling the DC intermediate circuit voltage,
- means for detecting interference in the network voltage,
- means responsive to the network voltage interference for setting a torque reference to a predetermined value,
- means for controlling the torque of the inverter part and limiting the current of the network converter,
- means for noticing network voltage recovery, and
- means responsive to the network voltage recovery for controlling the torque reference to a normal value.

11. A method according to claim 2, wherein the detecting of the network interference comprises a step where information on the interference is transmitted to the control unit of the frequency converter.

12. A method according to claim 3, wherein the detecting of the network interference comprises a step where information on the interference is transmitted to the control unit of the frequency converter.

13. A method according to claim 5, wherein the predetermined value of the torque reference is zero or another computed value.

14. A method according to claim 7, wherein the detecting of the network voltage recovery comprises a step where information on the network voltage recovery is transmitted to the control unit.

* * * * *